United States Patent [19]

Jondrow

[11] Patent Number: 4,838,585
[45] Date of Patent: Jun. 13, 1989

[54] HANDLE-LATCH MECHANISM

[75] Inventor: Timothy J. Jondrow, Corvallis, Oreg.

[73] Assignee: Hewlett-Packard Company, Palo Alto, Calif.

[21] Appl. No.: 98,263

[22] Filed: Sep. 18, 1987

[51] Int. Cl.⁴ .............................. F05C 9/04; F05C 9/24
[52] U.S. Cl. ...................................... 292/8; 190/118;
  292/DIG. 42; 292/DIG. 48; 292/171; 292/38
[58] Field of Search ............... 190/115, 118, 117, 119,
  190/120; 292/8, 38, 35, 125, 171, 141, 336.3,
  DIG. 30, DIG. 31, DIG. 42, DIG. 48;
  220/334, 318, 315, 94 R

[56] References Cited

U.S. PATENT DOCUMENTS

| | | | |
|---|---|---|---|
| 233,908 | 11/1880 | Appleton | 190/118 |
| 308,664 | 12/1884 | Goertz | 190/118 |
| 439,138 | 10/1890 | French | 190/118 |
| 867,269 | 10/1907 | Hiering et al. | 190/118 |
| 1,223,855 | 4/1917 | Noel et al. | 190/118 |
| 1,419,934 | 6/1922 | Klemer | 190/118 |
| 1,454,651 | 5/1923 | Panyity | 292/DIG. 48 |
| 2,238,480 | 4/1941 | Tierney | 292/28 |
| 3,828,899 | 8/1974 | Scott | 292/DIG. 48 |
| 4,363,226 | 12/1982 | Flemington et al. | 292/28 |
| 4,365,490 | 12/1982 | Manzoni | 292/DIG. 48 |

FOREIGN PATENT DOCUMENTS

| | | | |
|---|---|---|---|
| 344530 | 3/1960 | Switzerland | 190/118 |
| 11731 | of 1903 | United Kingdom | 190/118 |

*Primary Examiner*—Gary L. Smith
*Assistant Examiner*—Eric K. Nicholson

[57] ABSTRACT

A handle-latch mechanism is described for use in a portable carrying case of the type having an openable cover portion (e.g., a portable computer case). The handle is movable between extended and retracted positions. The latch for the case is releasable only when the handle is in its retracted position (e.g., latch actuators are movable only when the handle is in its retracted position). The handle and latch mechanism may be located in eithe the cover portion or the main body of the carrying case.

20 Claims, 5 Drawing Sheets

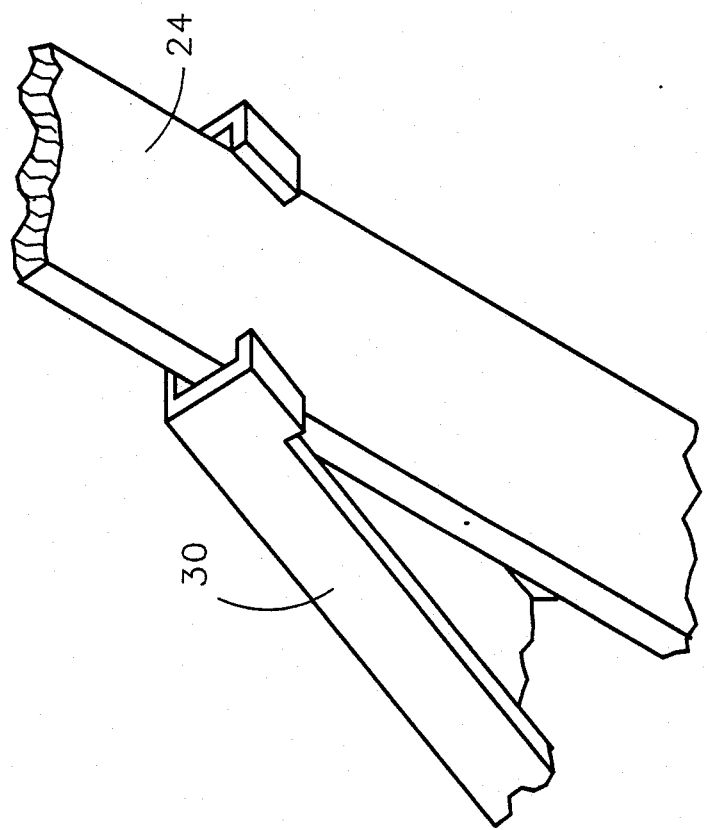

HANDLE-LATCH MECHANISM

FIELD OF THE INVENTION

This invention relates to collapsible handle mechanisms for portable objects. More particularly, this invention relates to handle mechanisms for openable cases. Even more particularly, this invention relates to handle mechanisms which also include latches for an openable case.

BACKGROUND OF THE INVENTION

The carrying of portable objects such as portable computers or the like is greatly facilitated with the provision of a handle which can be grasped by the hand. After the computer or other such object reaches its destination for use, however, the handle must not interfere with the actual use of the computer or other object. It is also necessary to be able to open the carrying case to provide access to the computer or other such object.

There has not heretofore been provided a handle and latch mechanism for a carrying case for a computer or other such object which is fully functional and effective, easy to operate, and yet retractable or collapsible when the computer is being used for its intended purpose.

SUMMARY OF THE INVENTION

In accordance with the present invention there is provided a handle and latch mechanism which is especially useful in a carrying case for a portable computer or the like. The handle must be in a collapsed or retracted position before the latch can be opened. The handle-latch mechanism comprises, in one embodiment:

(a) an elongated handle member having first and second ends, the handle member being movable between extended and retracted positions;

(b) first and second slider members carried by the case and being movable between inner and outer positions;

(c) first and second link members pivotally attached between the handle member and the slider members;

(d) bias means adapted to urge the first and second slider members to their inner positions;

(e) latch means carried by the case and being movable between open and closed positions;

(f) latch actuator means adapted to move the latch means between the open and closed positions, the actuator means being slidably attached to one of the link means in a manner such that the actuator means is slidable between first and second positions when the handle is in its retracted position.

With the handle latch mechanism of this invention the carrying case cannot be opened until the handle is in its retracted position. This prevents the carrying case from being accidentally or inadvertently opened while being carried from one location to another. When the handle is retracted to its collapsed position it is out of the way of the user.

The handle motion is due to the 'over center' action of the link member pivoting in both the handle and slider member, with force supplied by bias means such as a spring. When the handle is in its retracted position it is held in place by the reactionary forces of the handle, resting against a support, opposing the spring force transmitted to the link by the slider member.

In one embodiment the handle member rests against a support recessed into the case, and the support includes a fulcrum near each end of the handle. Then either end of the handle can be pushed against a fulcrum so as to urge the opposite end upwardly. In another embodiment the pivot point near the end of the handle is used as a fulcrum, thereby enabling the end of the handle to be pushed inwardly toward the case in a manner such that the opposite end of the handle is urged upwardly. Once either end of the handle is urged upwardly the bias means (e.g., a spring) moves the slider to its inner position. Releasing the other end of the handle then enables the bias means to move the other slider to its inner position and also force such end of the handle to its extended position.

The handle member can be moved from one position to the other using only one hand or even one finger, if desired. The latch may be released easily using the actuators located adjacent the handle. This is a very desirable feature. The latches themselves may be positioned in the same wall of the case as the slider members, or they may be positioned in the side walls, if desired. The case may include a recessed area for the handle to be received in when in retracted position.

Other advantages of the handle-latch mechanism will become apparent from the following detailed description and the appended drawings.

BRIEF DESCRIPTION OF THE DRAWINGS

The invention is described in more detail hereinafter with reference to the accompanying drawings wherein like reference characters refer to the same parts throughout the several views and in which:

FIG. 4a is a fragmentary perspective view which illustrates the sliding and pivotal connection of the latch actuator and the handle link.

DETAILED DESCRIPTION OF THE INVENTION

Figure 1:
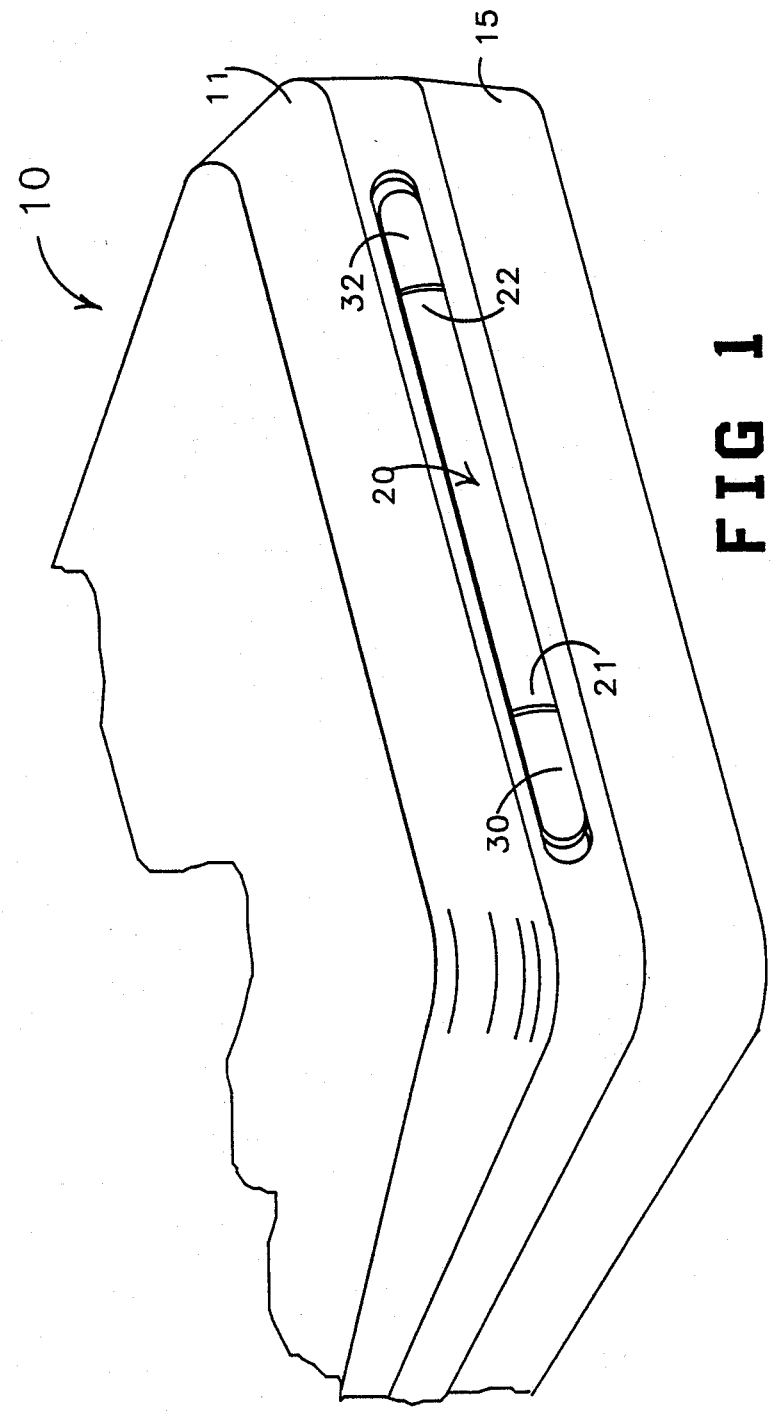
FIG. 1 is a perspective view of a portable carrying case which includes a handle-latch mechanism of the invention in its retracted position.
Figure 2:
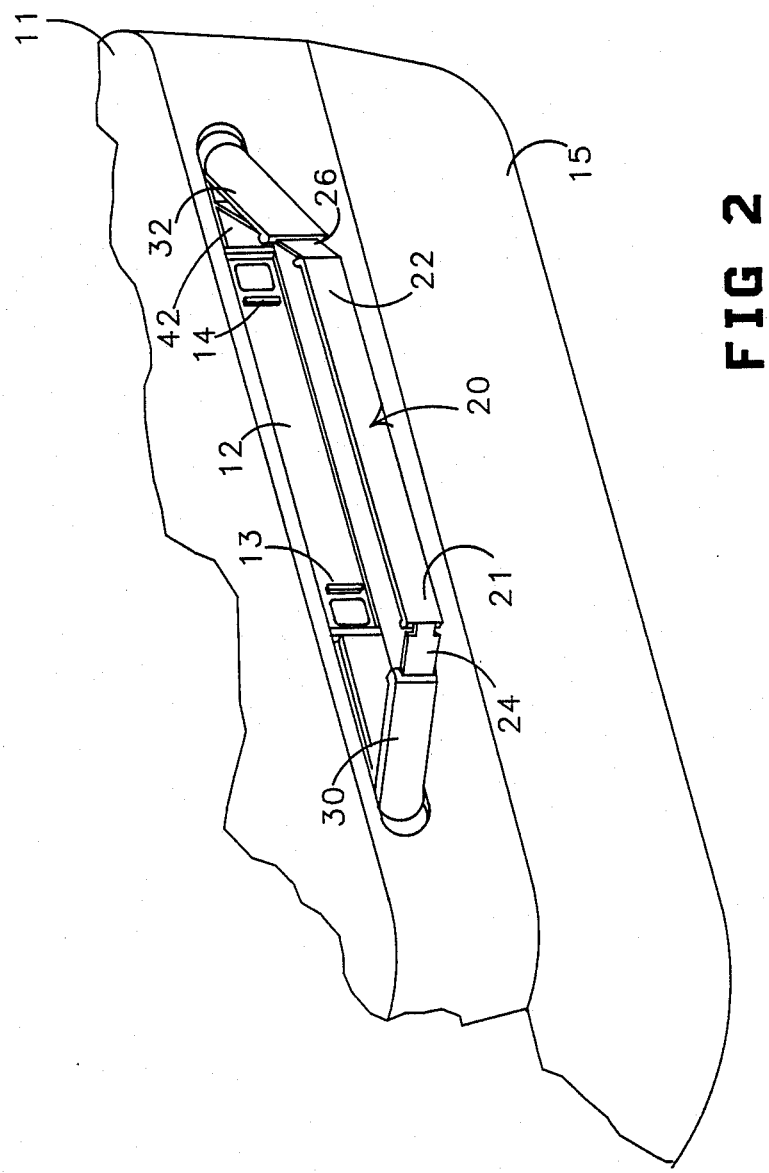
FIG. 2 is a perspective view of the case of FIG. 1 wherein the handle is in its extended position.

In the drawings there is illustrated a portable carrying case 10 of a type which is useful for enclosing a portable computer or the like. The handle member 20 is movable between retracted and extended positions. When the handle member is in its extended position it is available for grasping by the hand for carrying the case from one location to another. After reaching the desired location, the user can simply push the handle member toward the body of the case to return it to its retracted position where it remains until it is needed again for carrying the case to another location. When the handle member is in its retracted position it is out of the way. Preferably the handle member fits into a recessed area in the case when it is in its retracted position.

Pivotally attached to the ends of handle 20 are links 24 and 26. One end of each link is pivotally attached to an end of the handle, and the opposite ends of the links are pivotally attached to slider members 40 and 42. The slider members are carried by the case in a manner such that they can be independently movable (by sliding) between an inner position (when the handle 20 is in an up or extended position) and an outer position (when handle 20 is in its retracted or down position).

Bias means such as a spring 50 is attached to the underside of each slider member and urges each slider memer towards its inner position. Because the handle 20 is in an over-center condition relative to link members 24 and 26 when the handle is in its down or retracted position, the force of spring 50 pulling the two link members toward each other tends to hold the handle 20 in its retracted position against support 12 (which is part of the case 10). This is a very desirable feature to assure that the handle member does not inadvertently move to its extended position when it isn't needed.

To move the handle 20 from its extended or up position to its down or retracted position, it is only necessary to push the handle 20 toward the case itself. This causes both of the slider members to move outwardly against the force of the spring 50. When the handle 20 passes through the centerline formed by the link members 24 and 26 and the handle 20, the force of the spring 50 urges the slider members towards each other with sufficient force to cause handle 20 to continue moving downward against support 12, as illustrated in the drawings.

Figure 3:
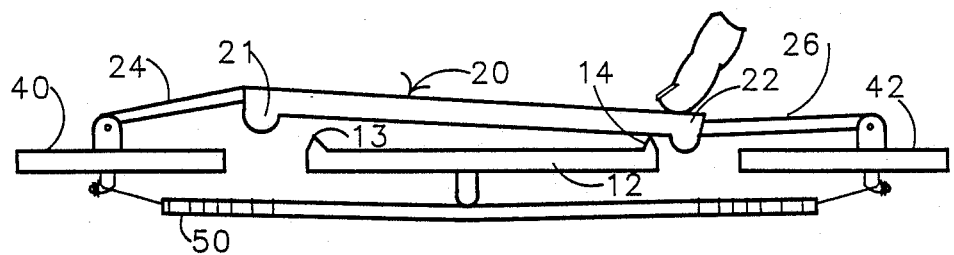
FIG. 3 is a cross-sectional view illustrating the manner in which one embodiment of handle mechanism may be moved from its retracted position to its extended position.
Figure 4:
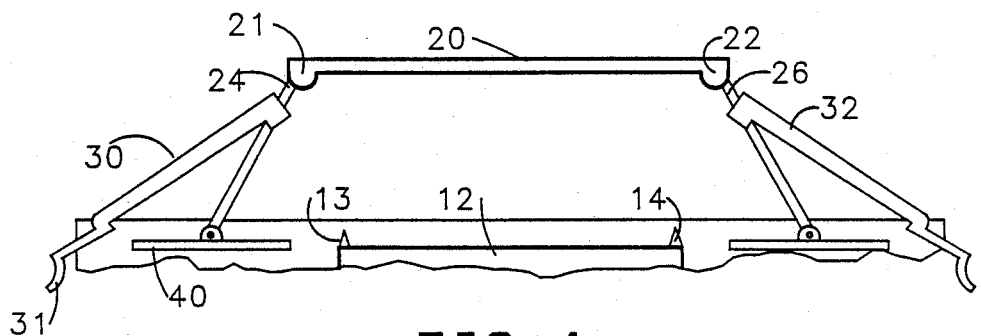
FIG. 4 is a cross-sectional view showing the handle mechanism in its extended position.
Figure 5:
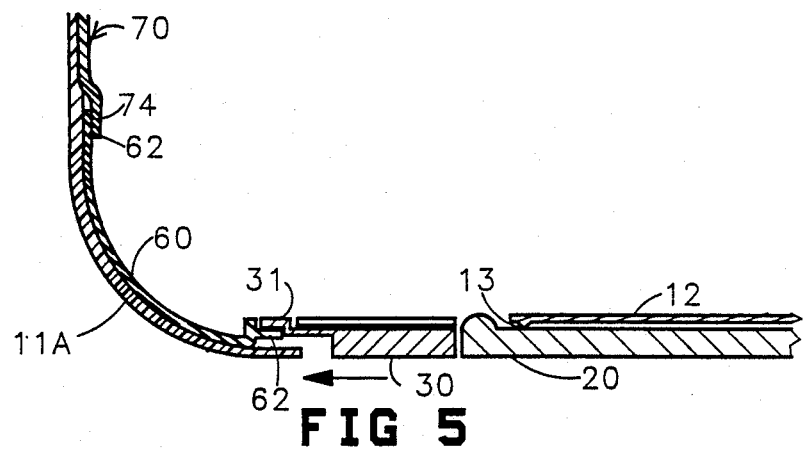
FIG. 5 is a cross-sectional view illustrating the manner in which the latch actuator means is adapted to control opening of the latch.
Figure 6:
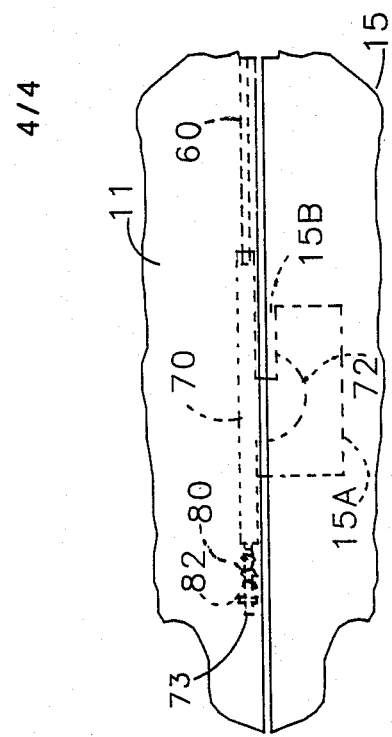
FIG. 6 is a side view illustrating movement of the latch in the case to enable the case to be opened.

Preferably the support 12 includes fulcrums 13 and 14 which are positioned such that each one is near an end of handle 20 when the handle is in its retracted position. When it is desired to move the handle from its retracted position to its extended or up position, it is only necessary to push downwardly on one end of handle 20 (e.g., as illustrated in FIG. 3). By pushing end 22 of handle 20 downwardly against fulcrum 14, the opposite end 21 of handle 20 is forced upwardly to cross the line of action of the spring force. This enables the spring 50 to move slider member 40 to its inner position and thereby push end 21 of handle 20 upwardly via pivoting link 24. Then when end 22 is released, the force of spring 50 also urges slider member 42 to its inner position and cause end 22 to be pushed upwardly via pivoting link 26.

Figure 7:
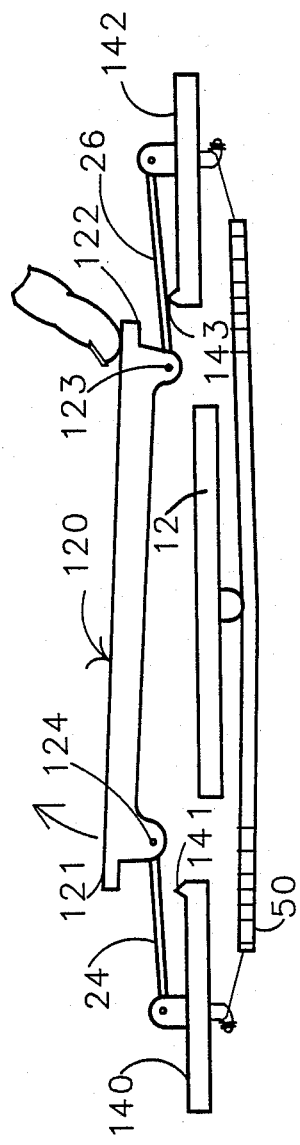
FIG. 7 is a cross-sectional view similar to FIG. 3 illustrating the manner in which another embodiment of handle mechanism may be moved from its retracted position to its extended position.

Another embodiment of handle member is illustrated in FIG. 7. In this embodiment handle member 120 is shown pivotally attached near each of its ends to link members 24 and 26 by means of pins 124 and 123.

The ends 121 and 122 of the handle extend outwardly past the pivot points 123 and 124. The inward ends of the two slider members 140 and 142 include raised stop members 141 and 143, respectively, against which link members 24 and 26 rest when the handle 120 is in its retracted position.

When one of the ends (e.g., 122) of the handle 120 is pushed downwardly as illustrated, the opposite end 121 is urged upwardly in the direction of the arrow. When pivot point 124 passes across the line of action of the spring force, the spring 50 moves slider 140 inwardly, whereby link 24 pushes end 121 upwardly. Then when the finger is removed from end 122, the spring 50 urges slider 142 inwardly to force end 122 upwardly.

The invention also includes a latch mechanism which can be actuated only when the handle member is in its down or retracted position. There are preferably two latches for the carrying case (i.e., to latch an openable cover to the main body of the carrying case). The latches may be located on the front wall of the case or on opposite side walls. In the drawings shown herein the latches are located on opposite side walls.

The cover portion is preferably hinged to the main body of the carrying case. For example, the cover portion may be hinged to the case along the rear edge. In such event, it is preferred for the handle member to be located on the front edge of the case. The handle and the latch mechanism may be located in either the cover portion or in the main body portion of the case. For purposes of this invention they are considered equivalent locations. Thus, reference to placement of the handle and latch mechanism in the cover portion may equally be considered to be a reference to placement of the handle and latch mechanism in the case body portion.

The latch mechanism includes a movable finger which projects outwardly from the cover portion towards the case portion (or vice-versa, as explained above). The case portion includes a ledge or step portion which can be engaged by the finger. The finger is movable between a lock position where it engages the ledge or step and an open or release position where it is disengaged from the ledge or step to allow the cover to be opened.

In the drawings the movable latch member 70 is shown supported by cover member 11. Latch member 70 includes a depending finger member 72 which is received in opening 15A along the upper edge of carrying case body portion 15. The opening 15A includes a ledge or step portion 15B which is engaged by the finger 72 when the latch member 70 is in its lock position, as shown.

The rear portion 73 of latch 70 is biased toward the lock position by means of spring 80 supported by stop member 82. The latch 70 may be urged rearwardly against spring 82 in order to move the latch 70 to its release position.

In accordance with this invention, the latch 70 is moved to its release position by means of strip member 60 which includes finger 62 to engage opening 74 near the front of latch 70. The opposite end 62 of strip member 60 is adapted to be engaged by a latch actuator member 30 located at the front of the case near the handle member 20. Latch actuator 30 includes an end portion 31 which rests against end 62 of strip 60. Then when actuator 30 is moved outwardly in the direction of the arrow the strip 60 is forced to move outwardly and around curved corner 11A to cause the latch member 70 to move to its release position.

Because the strip or link 60 is loaded in compression around curved corner 11A, the strip is able to transfer a large force without buckling or bending away from the wall it is resting against. Thus, strip or link 60 is made of a flexible material (e.g., flexible nylon in strip form) which can flex as it is pushed around the curved corner by the actuator 30.

As illustrated in the drawings, when the handle member 20 is in the down or retracted position the latch actuator may be moved from its inner position to its outer position so as to cause the desired movement of the strip or link 60. However, when the handle 20 is in its up or extended position, neither latch actuator 30 or 32 can be moved to the outer position. Thus, the latch 70 cannot be moved to its open or release position by means of actuator 30 or 32 when the handle 20 is up.

Each latch actuator is mounted at its inner end to a link member for the handle 20. Thus, the inner end of latch actuator 30 is attached to link 24 in a manner which (a) causes the inner end of actuator 30 to be raised upwardly when the handle 20 is in the up or extended position, and (b) enables the latch actuator to be moved outwardly in a sliding motion when the handle 20 is in the down or retracted position. A corresponding situation exists for latch actuator 32 and link 26.

As illustrated in the drawings, the inner end of each latch actuator is pivotally attached to a handle link. For example, tabs may be provided at the side edges near the inner end of each latch actuator for curving around and extending behind the corresponding handle link to form a pivotal connection which permits sliding motion therealong also.

Other variants are possible without departing from the scope of the present invention.

What is claimed is:

1. A handle-latch mechanism for use in a portable carrying case of the type having an openable cover portion, wherein said handle-latch mechanism comprises:
    (a) an elongated handle member having first and second ends; said handle member being movable between extended and retracted positions;
    (b) first and second slider members carried by said case and being movable between inner and outer positions;
    (c) first and second link members pivotally attached between said first and second ends of handle member and said first and second slider members, respectively;
    (d) bias means adapted to urge said first and second slider members to their said inner positions;
    (e) latch means carried by said case and being movable between open and closed positions; and
    (f) latch actuator means adapted to move said latch means between said open and closed positions, said latch actuator means being slidably attached to said link member in a manner such that said actuator means is slidable between first and second positions when said handle member is in said retracted position;
wherein said case includes a support against which said handle member rests when in said retracted position.

2. A handle-latch mechanism in accordance with claim 1, wherein said handle member is in an over-center position with respect to said link members when said handle is in said retracted position.

3. A handle-latch mechanism in accordance with claim 1, wherein said support includes a fulcrum, and wherein one end of said handle member extends over said fulcrum; and wherein when said first end of said handle member is urged downwardly against said fulcrum said second end of said handle member is forced upwardly.

4. A handle-latch mechanism in accordance with claim 3, wherein said support includes two fulcrums, and wherein each said end of said handle member extends over a said fulcrum.

5. A handle-latch mechanism in accordance with claim 1, further including latch bias means adapted to urge said latch means toward its closed position.

6. A handle-latch mechanism in accordance with claim 1, wherein said first and second ends of said handle are attached to said link members in a manner such that when said first end of said handle is urged toward said case said second end of said handle is urged outwardly.

7. A handle-latch mechanism for use in a portable carrying case of the type having an openable cover portion, wherein said handle-latch mechanism comprises:
    (a) an elongated handle member having first and second ends;
    (b) first and second slider members which are captured in said case and are slidable between inner and outer positions;
    (c) first and second link members, pivotally attached between said first and second ends of said handle member and said first and second slider members, respectively;
    (d) bias means adapted to urge said first and second slider members to their inner positions;
    (e) first and second latch means carried by said case and each being movable between open and closed positions;
    (f) first and second latch actuator means adapted to move said first and second latch means, respectively, from said closed position to said open position; wherein each said latch actuator means is slidably attached to a said link member in a manner such that each actuator means is slidable between first and second positions when said handle member is in said retracted position;
wherein said case includes a support against which said handle member rests when in said retracted position; wherein said handle member is in an over-center position with respect to said link members when said handle is in said retracted position.

8. A handle-latch mechanism in accordance with claim 7, wherein said support includes a fulcrum, wherein said first end of said handle member extends over said fulcrum; and wherein when said first end of said handle member is urged downwardly against said fulcrum said second end of said handle member is forced upwardly.

9. A handle-latch mechanism in accordance with claim 7, wherein said handle-latch mechanism is carried by said cover portion of said case, further comprising latch bias means adapted to urge said latch means toward its closed position.

10. A handle-latch mechanism in accordance with claim 8, wherein said support includes two fulcrums, and wherein each said end of said handle member extends over a said fulcrum.

11. A handle-latch mechanism in accordance with claim 7, further comprising first and second latch links connecting said first and second latch actuator means with said first and second latch means, respectively.

12. A handle-latch mechanism in accordance with claim 11, wherein said case includes a front wall and first and second side walls connected to said front wall by means of curved corners, wherein handle is located on said front wall and said first and second latch means are located in said side walls; and wherein said first and second latch links comprise flexible strips which extend from said front wall along said curved corners to said latch means.

13. A portable computer carrying case which includes a hinged cover member and a handle-latch mechanism, wherein said handle-latch mechanism comprises:
   (a) an elongated handle member having first and second ends;
   (b) first and second slider members which are captured in said case and are slidable between inner and outer positions;
   (c) first and second link members, pivotally attached between said first and second ends of said handle member and said first and second slider members, respectively;
   (d) bias means adapted to urge said first and second slider members to their inner positions;
   (e) first and second latch means carried by said case and each being movable between open and closed positions;
   (f) first and second latch actuator means adapted to move said first and second latch means, respectively, from said closed position to said open position; wherein each said latch actuator means is slidably attached to a said link member in a manner such that each actuator means is slidable between first and second positions when said handle member is in said retracted position;
wherein said case includes a support against which said handle member rests when in said retracted position; wherein said handle member is in an over-center position with respect to said link members when said handle is in said retracted position.

14. A portable case in accordance with claim 13 wherein said support includes a fulcrum, wherein said first end of said handle member extends over said fulcrum; and wherein when said first end of said handle member is urged downwardly against said fulcrum said second end of said handle member is forced upwardly.

15. A portable case in accordance with claim 13, wherein said handle-latch mechanism is carried by said cover portion of said case, further comprising latch bias means adapted to urge said latch means toward its closed position.

16. A portable case in accordance with claim 14, wherein said support includes two fulcrums, and wherein each said end of said handle member extends over a said fulcrum.

17. A portable case in accordance with claim 13, wherein further comprising first and second latch links connecting said first and second latch actuator means with said first and second latch means, respectively.

18. A portable case in accordance with claim 17, wherein said case includes a front wall and first and second side walls connected to said front wall by means of curved corners, wherein handle is located on said front wall and said first and second latch means are located in said side walls; and wherein said first and second latch links comprise flexible strips which extend from said front wall along said curved corners to said latch means.

19. A portable case in accordance with claim 13, wherein said first and second ends of said handle are attached to said link members in a manner such that when said first end of said handle is urged toward said case said second end of said handle is urged outwardly.

20. A handle-latch mechanism for use in a portable carrying case of the type having an openable cover portion, wherin said handle-latch mechanism comprises:
   (a) an elongated handle member having first and second ends; said handle member being movable between extended and retracted positions;
   (b) first and second slider members carried by said case and being movable between inner and outer positions; wherein each said slider member includes a raised stop member.
   (c) first and second link members pivotally attached between said first and second ends of handle member and siad first and second slider members, respectively;
   (d) bias means adapted to urge said first and second slider members to their said inner positions;
   (e) latch means carried by said case and being movable between open and closed positions; and
   (f) latch actuator means adapted to move said latch means between said open and closed positions, said latch actuator means being slidably attached to a said link member in a manner such that said actuator means is slidable between first and second positions when said handle member is in said retracted position;
wherein each said link member rests against a said stop member on a said slider member when said handle member is in said retracted position.

* * * * *